United States Patent [19]

Takahata et al.

[11] Patent Number: 5,633,548
[45] Date of Patent: May 27, 1997

[54] METHOD FOR SETTING UP A SUPERCONDUCTING BEARING DEVICE

[75] Inventors: Ryoichi Takahata, Nara; Shoji Eguchi, Osaka, both of Japan

[73] Assignee: Koyo Seiko Co., Ltd., Osaka, Japan

[21] Appl. No.: 543,884

[22] Filed: Oct. 17, 1995

Related U.S. Application Data

[60] Continuation-in-part of Ser. No. 160,797, Dec. 3, 1993, abandoned, which is a division of Ser. No. 730,164, Jul. 16, 1991, Pat. No. 5,330,967.

[30] Foreign Application Priority Data

| Jul. 17, 1990 | [JP] | Japan | 2-188693 |
| Dec. 18, 1990 | [JP] | Japan | 2-403263 |

[51] Int. Cl.[6] ............................ B60L 13/04; H02K 7/09
[52] U.S. Cl. ............................ 310/90.5; 505/878
[58] Field of Search ............ 310/90.5; 505/877, 505/878, 903

[56] References Cited

U.S. PATENT DOCUMENTS

| 4,797,386 | 1/1989 | Gyorgy et al. | 310/90.5 |
| 4,987,674 | 1/1991 | Denk | 29/598 |
| 5,126,317 | 6/1992 | Agarwala | 310/90.5 |
| 5,126,611 | 6/1992 | Armstrong et al. | 310/90.5 |
| 5,177,387 | 1/1993 | McMichael et al. | 310/90.5 |
| 5,220,232 | 6/1993 | Rigney, II et al. | 310/90.5 |
| 5,245,270 | 9/1993 | Akiyama | 322/4 |
| 5,254,528 | 10/1993 | Takahata | 505/1 |
| 5,270,601 | 12/1993 | Rigney, II | 310/90.5 |
| 5,289,150 | 2/1994 | Rabinowitz | 335/216 |
| 5,314,868 | 5/1994 | Takahata et al. | 310/90.5 |
| 5,330,967 | 7/1994 | Takahata et al. | 310/90.5 |
| 5,446,018 | 8/1995 | Takahata et al. | 310/90.5 |

*Primary Examiner*—Clayton E. LaBalle
*Attorney, Agent, or Firm*—Reid & Priest LLP

[57] ABSTRACT

A superconducting bearing device includes a permanent magnet on a rotor, with a superconductor placed opposite the magnet. Flux trapped in the superconductor during cooling helps to stabilize the rotor. More specifically, the permanent magnet is mounted on the rotor so that, as the rotor rotates, its rotation does not alter the magnetic flux distribution around the axis of rotation of the rotor. The superconductor permits penetration of the magnetic flux from the magnet, being spaced from the magnet by a distance that permits a predetermined quantity of the magnetic flux to penetrate it, while not permitting rotation of the rotor to alter the distribution of the penetrating magnetic flux.

21 Claims, 5 Drawing Sheets

METHOD FOR SETTING UP A SUPERCONDUCTING BEARING DEVICE

This is a continuation-in-part of U.S. patent application Ser. No. 08/160,797, filed Dec. 3, 1993 (now abandoned), which was a divisional of U.S. application Ser. No. 07/730,164, filed Jul. 16, 1991, now U.S. Pat. No. 5,330,967, issued Jul. 19, 1994.

BACKGROUND OF THE INVENTION

The present invention relates to superconducting bearing devices having incorporated therein a superconductor permitting penetration of a magnetic flux thereinto.

Superconducting bearing devices heretofore known include, for example, the one disclosed in Unexamined Japanese Patent Publication SHO 63-243523.

The superconducting bearing device disclosed includes a Type I superconductor, i.e., a superconductor preventing the penetration of magnetic flux perfectly to utilize the perfect diamagnetism of the superconductor. The device comprises a rotary shaft made of the superconductor and having its opposite ends fitted in a pair of recesses each of which is formed in a support member of magnetic material magnetized to one of the polarities, the rotary shaft being supported in a non-contacting position axially thereof.

With the known superconducting bearing device, the rotary shaft is supported in a non-contacting position utilizing perfect diamagnetism as stated above and is therefore instable with respect to a direction orthogonal to the direction of repulsion, so that the support member for supporting each end of the rotary shaft must be machined to a shape surrounding the shaft end. Furthermore,between the shaft end and the support member, the portion opposed to the shaft end axially and radially of the shaft needs to be magnetized. Accordingly, the device is cumbersome to design and make.

SUMMARY OF THE INVENTION

The main object of the present invention is to provide a superconducting bearing device adapted to support a rotatable member by a simple construction.

The present invention provides a superconducting bearing device which comprises, in a temperature environment for realizing a Type II superconducting state, a permanent magnet portion provided on a rotatable member, and a Type II superconductor disposed as opposed to the permanent magnet portion, the permanent magnet portion being so mounted on the rotatable member that the rotation of the rotatable member does not alter the magnetic flux distribution around the axis of rotation of the rotatable member, the Type II superconductor permitting penetration of the magnetic flux of the permanent magnet portion thereinto and being spaced apart from the permanent magnet portion by a distance permitting a predetermined quantity of magnetic flux thereof to penetrate thereinto, the superconductor being disposed at a position not permitting the rotation of the rotatable member to alter the distribution of penetrating magnetic flux.

The invention provides a method for setting up a superconducting bearing device having the steps of, first, mechanically supporting the rotor at a position with respect to the Type II superconductor to permit magnetic flux from the permanent magnet to penetrate the Type II superconductor to magnetize it. Thereafter, the Type II superconductor is moved to and held at a temperature for realizing a Type II superconducting state. Finally, mechanical support is removed from the rotor to allow it to move downwardly its own weight to be held in a stable position at which gravity is in balance with a supportive magnetic force caused by the pinned flux.

This method may also be expressed in the following manner, in which the principles of operation are expanded on. The method involves setting up a superconducting bearing device which has a permanent magnet mounted on a rotor having a vertical axis of rotation and a Type II superconductor disposed in a magnetic field of the permanent magnet. The permanent magnet is provided on the rotor so that rotation of the rotor does not alter a magnetic flux's distribution about the axis of rotation of the rotor. The method has the first step of supporting the rotor by a positioning device, and spacing and positioning the rotor a distance from the Type II superconductor to permit a predetermined quantity of magnetic flux from the permanent magnet to penetrate the Type II superconductor, thereby magnetizing the type II superconductor by the magnetic field of the permanent magnet. Thereafter, the Type II superconductor is moved to and held at a temperature for realizing a Type II superconducting state, to pin the penetrating magnetic flux in the interior of the Type II superconductor so that the pinned magnetic flux distribution is symmetrical about the vertical axis of rotation of the rotor. Finally, the method includes the step of releasing the rotor from the positioning device and allowing the rotor to move slightly downwardly its own weight to be held in a stable position at which gravity is in balance with a magnetic force caused by the flux pinned to the interior of the superconductor.

According to an embodiment, the permanent magnet portion is in the form of a disk and mounted on the rotatable member concentrically therewith, and the superconductor is opposed to an end face of the magnet portion and spaced apart therefrom axially of the rotatable member.

According to another embodiment, the permanent magnet portion is in the form of a disk and mounted on the rotatable member concentrically therewith, and the super conductor is opposed to the outer periphery of the magnet portion and spaced apart therefrom radially of the rotatable member.

The restraining action of the magnetic flux of the permanent magnet portion penetrating into the superconductor stably holds the magnet portion and the superconductor opposed to each other and spaced apart by a predetermined distance. In this state, the rotatable member carrying the magnet portion can be rotated about the axis of the member. At this time, the external magnetic field acting on the superconductor offers no resistance to the rotation insofar as the magnetic flux distribution is uniform with respect to the axis of rotation and remains unchanged. Accordingly, the rotatable member can be supported by the superconductor in a non-contacting position radially and axially thereof when the magnet portion mounted on the rotatably member is merely position in place relative to the superconductor without the necessity of machining the superconductor to a shape surrounding the end of the member to support the member.

Thus, the device of the invention is adapted to rotatably support the rotatable member with good stability by a very simple construction.

According to another embodiment of the invention, the permanent magnet portion comprises a plurality of annular permanent magnets arranged at a spacing radially of the rotatable member and a nonmagnetic material interposed therebetween, and the ends of each permanent magnet which are opposite axially of the rotatable member are magnetized to polarities opposite to each other, all the permanent magnets being magnetized to the same polarity at their ends which are positioned toward the same direction with respect to the axis of rotation.

At each end of the permanent magnet portion thus constructed, the magnetism of one of the magnets repels that of another magnet of the same polarity, causing the magnetic flux to extend axially of the rotatable member and permitting an increased quantity of flux to penetrate into the superconductor which is disposed as opposed to the end face of the permanent magnet portion. Consequently, the superconductor traps the increased amount of flux to give the device an increased load capacity and enhanced rigidity.

According to another embodiment of the invention, the permanent magnet portion comprises a plurality of annular permanent magnets arranged at a spacing radially of the rotatable member and a nonmagnetic material interposed therebetween, and the side portions of each permanent magnet which are opposite radially of the member are magnetized to polarities opposite to each other, the opposed side portions of the adjacent magnets being magnetized to the same polarity.

At the opposed side portions of the adjacent magnets in this arrangement, the magnetism of one portion repels that of the other portion having the same polarity, with the result that the magnetic flux expands both axially and radially of the rotatable member. This permits an increased quantity of flux to penetrate into the superconductor which is opposed to the end faces of the permanent magnet portion and to the outer periphery thereof, consequently giving an increased load capacity and enhanced rigidity as in the above embodiment.

According to another embodiment of the invention, the permanent magnet portion comprises a plurality of annular permanent magnets arranged at a spacing axially of the rotatable member and a nonmagnetic material interposed therebetween, and the ends of each permanent magnet which are opposite axially of the rotatable member are magnetized to polarities opposite to each other, the opposed ends of the adjacent magnets being magnetized to the same polarity.

At the opposed ends of the adjacent magnets in this arrangement, the magnetism of one end repels that of the other end having the same polarity, with the result that the magnetic flux expands both axially and radially of the rotatable member. This permits an increased quantity of flux to penetrate into the superconductor which is opposed to the end faces of the permanent magnet portion and to the outer periphery thereof, consequently giving a greater load capacity and higher rigidity as in the above embodiment.

DESCRIPTION OF THE PREFERRED EMBODIMENTS

Figure 1:
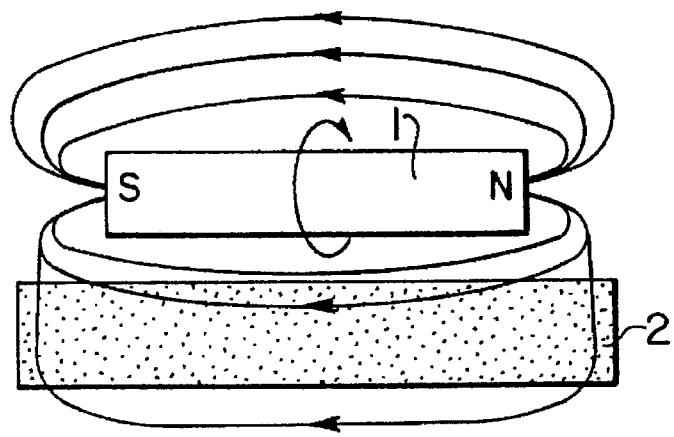
FIG. 1 is a side elevation schematically showing a first embodiment of superconducting bearing device of the invention.

Several embodiments of the present invention will be described below with reference to the drawings. Throughout the drawings, like parts are designated by like reference numerals.

FIG. 1 schematically shows the main arrangement providing a first embodiment.

This embodiment, i.e., a superconducting bearing device, comprises a solid cylindrical rotatable member 1, and a superconductor 2 in the form of a flat plate.

The rotatable member 1 in its entirety is a permanent magnet portion in the form of a single permanent magnet. The rotatable member 1 has one end magnetized to an N pole, and the other end magnetized to an S pole.

The superconductor 2 comprises a base plate which is prepared from a high-temperature superconducting material of the yttrium type of great pinning force, for example, $YBa_2Cu_3O_x$, and which contains normally conductive particles ($Y_2Ba_1Cu_1$) as uniformly mixed with the superconducting material. The superconductor 2 has properties to trap the magnetic flux released from the rotatable member 1 and penetrating thereinto.

The rotatable member 1 is disposed with its axis positioned horizontally and is rotatable about the axis without permitting alteration of the magnetic flux distribution around the axis despite the rotation.

The superconductor 2 is opposed to the rotatable member 1 and disposed at a position spaced apart from the member 1 by a distance permitting a predetermined quantity of magnetic flux of the member 1 to penetrate into the superconductor, the superconductor 2 further being so positioned that the rotation of the member 1 will not alter the distribution of penetrating magnetic flux. With the present embodiment, the superconductor 2 has its upper surface opposed to the outer peripheral surface of the rotatable member 1 and is positioned horizontally below the rotatable member 1 in parallel thereto.

When the bearing device is to be operated, the superconductor 2 is cooled by suitable cooling means and maintained in a superconducting state.

If the rotatable member 1 is merely disposed horizontally above the superconductor 2 as positioned horizontally in a superconducting state, only a small quantity of magnetic flux of the member penetrates into the superconductor 2, so that the member 1 is merely levitated by a repulsive force due to the Meissner effect of the superconductor 2 and is not supported stably.

However, when the rotatable member 1 is disposed above the superconductor 2 in the vicinity thereof first and the superconductor 2 is thereafter cooled to the superconducting state, a large quantity of magnetic flux released from the rotatable member 1 penetrates into the superconductor 2 and is trapped in this state. Since the superconductor 2 contains pinning centers (e.g., normally conductive particles) as uniformly mixed with the superconducting material, the magnetic flux penetrating into the superconductor 2 becomes distributed also uniformly and is held trapped. Consequently, the rotatable member 1 is held levitated above the superconductor 2 and supported axially and radially with high stability.

When the rotatable member 1 as thus supported in a non-contacting position is rotated about its axis, the magnetic flux penetrating into the superconductor 2 offers no resistance to the rotation because the magnetic flux distribution around the axis remains unchanged despite the rotation. Further because the rotation involves no frictional resistance unlike sliding or rolling bearings, the rotatable member 1 is to rotate permanently, whereas the member is influenced by air resistance and geomagnetism in actuality and therefore comes to a halt eventually. Nevertheless, such resistance to rotation is very small for the bearing device and almost negligible.

If the rotatable member 1 as supported in the above non-contacting position is pushed in one direction with a force smaller than the pinning force, the member 1 shifts in this direction once, then shifts toward the original position, thus undergoing a swinging motion for some time, and thereafter comes to a stop at the original position. However, if the rotatable member 1 is pushed toward one direction with a force greater than the pinning force, the member 1 stops upon moving to a position to which it is forcibly shifted from the original position. Thus, the member 1 is restrained in the shifted position. This phenomenon occurs owing to the pinning force peculiar to the superconductor 2 of the foregoing structure.

If the magnetic flux of the rotatable member 1 is held pinned to the supercontactor 2 as described above, the rotatable member 1 will always be supported with good stability by a restraining action.

Figure 2:
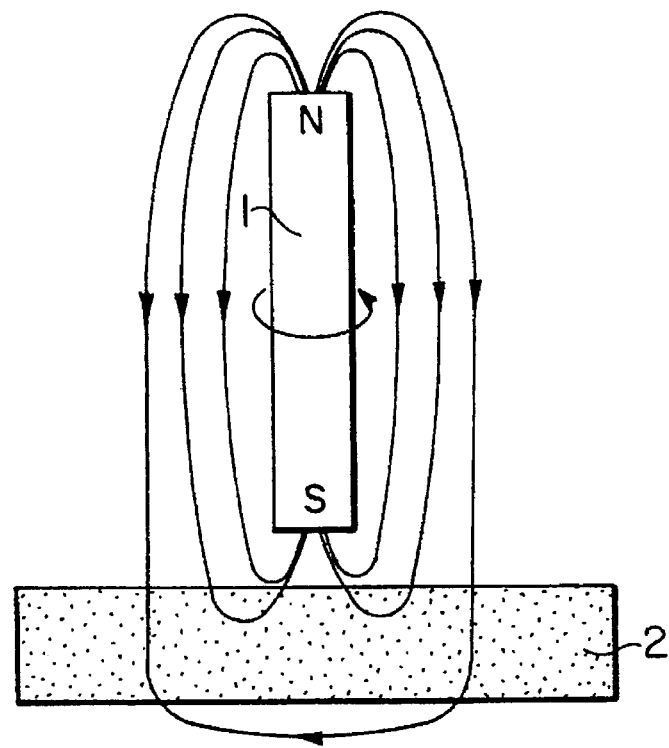
FIG. 2 is a side elevation schematically showing a second embodiment of superconducting bearing device of the invention.

FIG. 2 schematically shows the main portion of another superconducting bearing device as a second embodiment.

This embodiment is the same as the first embodiment with respect to the structure and arrangement of the superconductor 2. The rotatable member 1, although the same as the one included in the first embodiment, is disposed above the superconductor 2 with its axis of rotation positioned vertically. The upper surface of the superconductor 2 is opposed to the lower end face of the rotary member 1. With the exception of this feature, the second embodiment is the same as the first.

With the second embodiment, the rotatable member 1 is also supported as levitated above the superconductor 2 as in the case of the first embodiment.

In the foregoing two embodiments, the arrangement of the rotatable member 1 and the superconductor 2 may be inverted. In other words, the rotatable member 1 may be disposed below the lower surface of the superconductor 2 in proximity to the superconductor 2. The rotatable member 1 is then supported as levitated as if being suspended from the superconductor 2. Alternatively, if the rotatable member 1 is opposed, as positioned obliquely, to the superconductor 2, the member 1 is held levitated in the oblique position.

Figure 3:
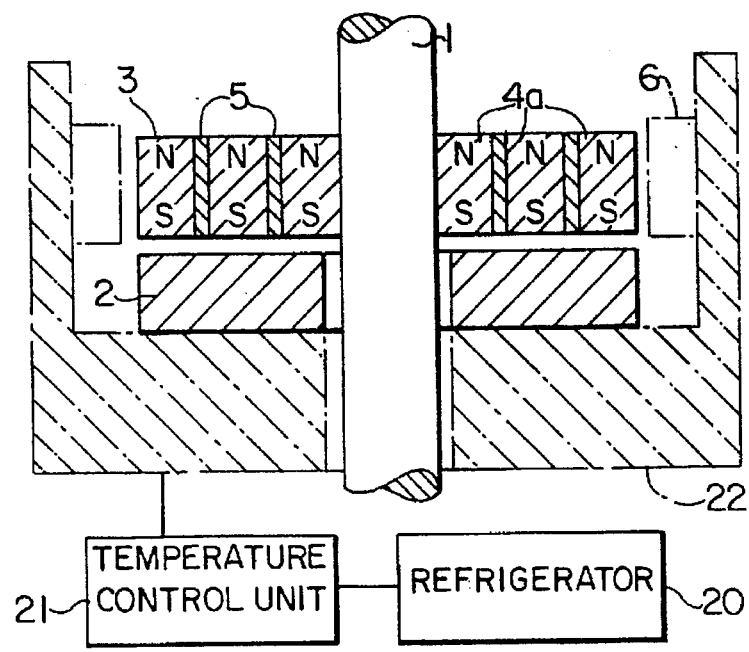
FIG. 3 is a view in vertical section schematically showing a third embodiment of superconducting bearing device of the invention.

FIG. 3 schematically shows the main portion of another superconducting bearing device, i.e., a third embodiment.

This bearing device comprises a rotatable member 1 in the form of a vertical shaft, and a superconductor 2. A permanent magnet portion 3 in the form of a horizontal disk is mounted on the rotatable member 1 concentrically therewith, and the superconductor 2 is opposed to the lower end face of the magnet portion 3 and spaced apart therefrom axially of the rotatable member 1. The superconductor 2 is in the form of a disk having a bore, and the rotatable member 1 extends through the bore with a clearance formed in the bore around the member 1.

The permanent magnet portion 3 is in the form of an integral assembly and comprises a plurality of annular permanent magnets 4a, 4b, 4c arranged at a spacing radially of the member 1, and a nonmagnetic material 5 interposed therebetween. The portion 3 is secured to the rotatable member 1. The upper and lower ends of each of the magnets 4a, 4b, 4c are magnetized to polarities opposite to each other, and all the magnets 4a, 4b, 4c are magnetized to the same polarity at their same ends. For example, the upper ends of all the magnets 4a, 4b, 4c are magnetized as N poles, and the lower ends thereof as S poles. The magnetic flux distribution around the axis of rotation is free of changes despite the rotation of the member 1.

The superconductor 2 has the same properties as the one included in the first embodiment and is disposed at a position spaced apart from the magnet portion 3 by a distance permitting a predetermined quantity of magnetic flux of the portion 3 to penetrate there into and which will not permit the rotation of the member 1 to alter the distribution of penetrating magnetic flux.

A cooling case 22 which is cooled by a refrigerator 20 or the like via a temperature control unit 21 is fixedly provided within a housing (not shown) for the bearing device. The superconductor 2 is fixed to the cooling case 22.

When the superconducting bearing device is operated, the superconductor 2 is cooled with a suitable refrigerant circulated through the cooling case 22 and maintained in a superconducting state. As in the case of the first embodiment, the restraining action of the magnetic flux penetrating into the superconductor 2 from the permanent magnet portion 3 and trapped in the superconduct 2 holds the rotatable member 1 and the superconductor 2 opposed to each other with a predetermined spacing provided therebetween and supports the member 1 as levitated above the superconductor 2.

At each end of the permanent magnet portion 3, the magnetism of one of the permanent magnets 4a, 4b, 4c repels that of another magnet of the same polarity, with the result that the magnetic flux extends to a greater extent axially of the rotatable member 1 than in the case where the permanent magnet portion has a single permanent magnet. Consequently, an increased quantity of flux penetrates into the superconductor 2 which is disposed as opposed to the lower end face of the magnet portion 3 for the superconductor 2 to trap the increased quantity of flux. This gives the device a greater load capacity and higher rigidity.

In addition to the superconductor 2, second superconductors 6 may be provided as indicated in broken lines in FIG. 3. These second superconductors 6 are arranged radially outwardly of the periphery of the permanent magnet portion 3 at a distance from and as opposed to the periphery. These superconductors 6 also support the rotatable member 1, consequently giving further enhanced rigidity to the entire bearing device. These superconductors 6 may form a completely annular block or may be segments of an annular block.

Figure 4:
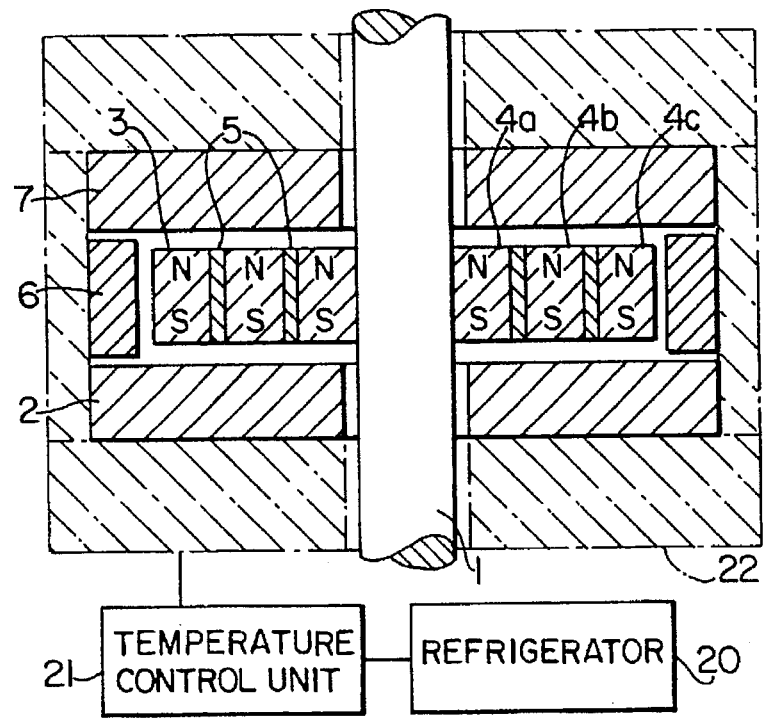
FIG. 4 is a view in vertical section schematically showing a fourth embodiment of superconducting bearing device of the invention.

FIG. 4 schematically shows the main portion of another superconducting bearing device, i.e. a fourth embodiment.

In this embodiment, superconductors 2, 6, 7 are provided as opposed respectively to the lower end face, outer peripheral surface and upper end face of a permanent magnet portion 3 on a rotatable member 1.

Figure 5:
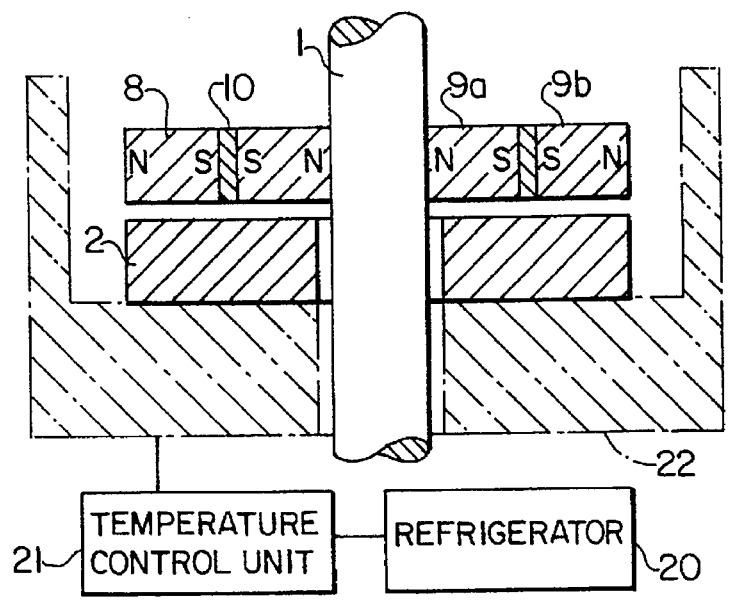
FIG. 5 is a view In vertical section schematically showing a fifth embodiment of superconducting bearing device of the invention.

FIG. 5 schematically shows the main portion of another superconducting bearing device, i.e., a fifth embodiment.

This embodiment has a permanent magnet portion 8 which also comprises a plurality of annular permanent magnets 9a, 9b arranged at a spacing radially of the rotatable member 1 and a nonmagnetic material 10 interposed therebetween. The side portions of each permanent magnet 9a or 9b which are opposite radially of the rotatable member 1 are magnetized to polarities opposite to each other, and the opposed side portions of the adjacent magnets 9a, 9b are magnetized to the same polarity. For example, the inner side portion of the inner magnet 9a has N pole, the outer side portion thereof S pole, the inner side portion of the outer magnet 9b S pole, and the outer side portion thereof N pole. Three or more permanent magnets, when used, are also magnetized similarly.

At the opposed side portions of the adjacent magnets 9a, 9b in this embodiment, the magnetism of one side portion repels that of the other side portion having the same polarity, with the result that the magnetic flux expands both axially and radially of the rotatable member. This permits an increased quantity of flux to penetrate into the superconductor 2 which is opposed to the lower end face of the permanent magnet portion 8.

In this case, additional superconductors may also be provided as opposed to the outer peripheral surface and the upper end face of the magnet portion 8.

Figure 6:
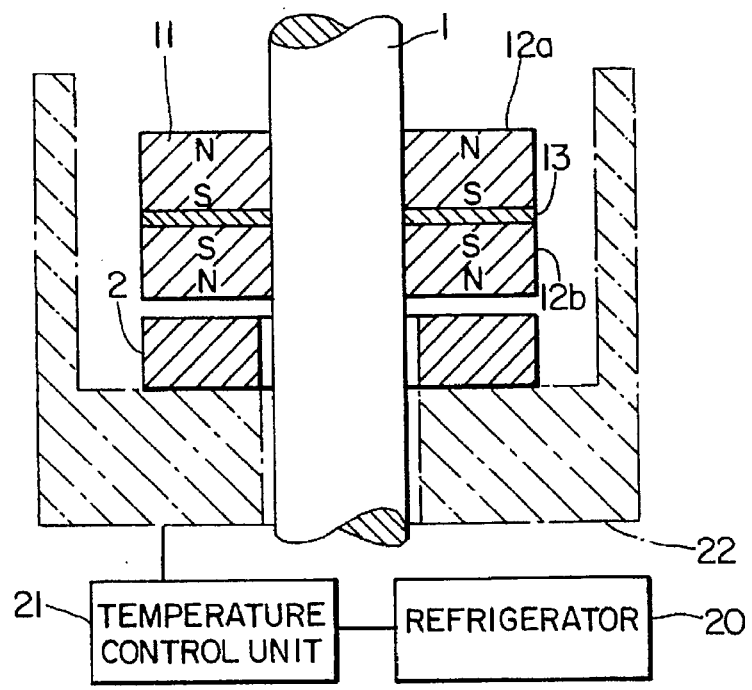
FIG. 6 is a view in vertical section schematically showing a sixth embodiment of superconducting bearing device of the invention.

FIG. 6 schematically shows the main portion of another superconducting bearing device, i.e., a sixth embodiment.

This embodiment has a permanent magnet portion 11 in the form of an integral assembly and comprising a plurality of annular permanent magnets 12a, 12b arranged at a spacing axially of the rotatable member 1 and a nonmagnetic material 13 interposed therebetween. The side portions of each magnet 12a or 12b which are opposite axially of the rotatable member are magnetized to polarities opposite to each other, and the opposed ends of the adjacent magnets 12a, 12b are magnetized to the same polarity. For example, the upper end of the upper magnet 12a is magnetized as N pole, the lower end thereof as S pole, the upper end of the lower magnet 12b as S pole, and the lower end thereof as N pole. The same is true of the case wherein three or more permanent magnets are used.

At the opposed ends of the adjacent magnets 12a, 12b of the sixth embodiment, the magnetism of one end repels that of the other end having the same polarity, with the result that the magnetic flux expands both axially and radially of the rotatable member. This permits an increased quantity of flux to penetrate into the superconductor 2 which is opposed to the lower end face of the magnet portion 11.

In this case, additional superconductors may also be provided as opposed to the outer peripheral surface and the upper end face of the permanent magnet portion 11.

Figure 7:
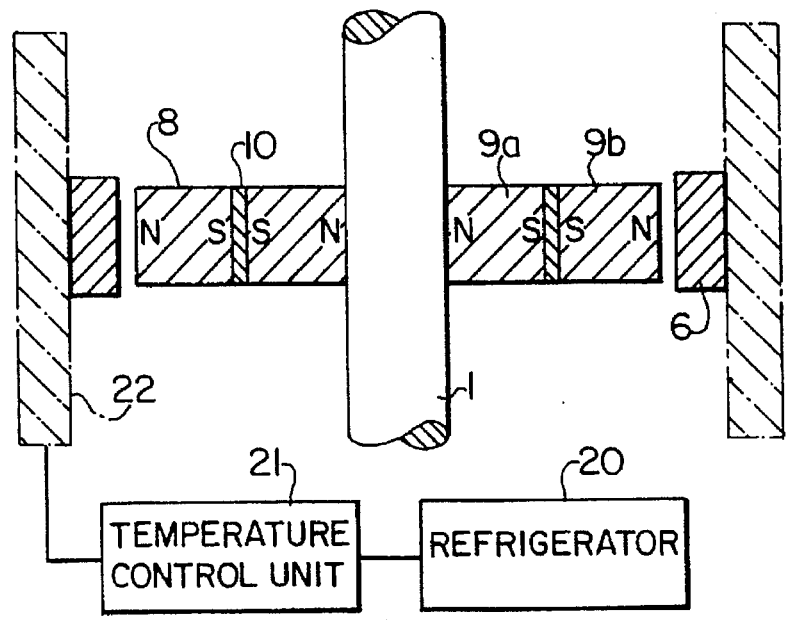
FIG. 7 is a view in vertical section schematically showing a seventh embodiment of superconducting bearing device of the invention.

FIG. 7 schematically Shows the main portion of another superconducting bearing device, i.e., a seventh embodiment.

In this embodiment, the superconductor 2 of the fifth embodiment is replaced by a superconductor 6 opposed to the outer peripheral surface of the permanent magnet portion 8.

As already stated with reference to the fifth embodiment, the magnetic flux expands both axially and radially of the rotatable member also in this case, with the result that an increased quantity of flux penetrates into the superconductor 6 which is disposed as opposed to the outer peripheral surface of the magnet portion 8.

Figure 8:
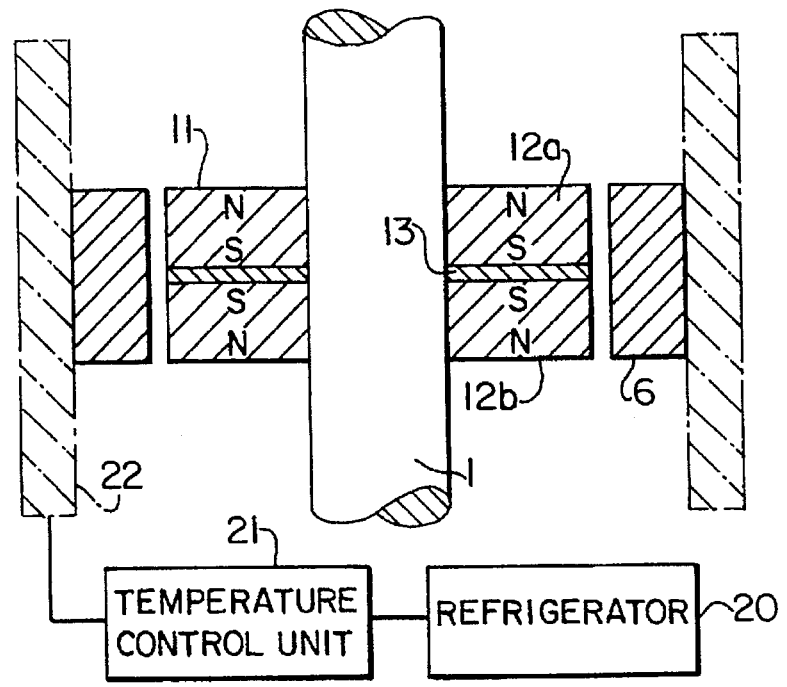
FIG. 8 is a view in vertical section schematically showing an eighth embodiment of superconducting bearing device of the invention.

FIG. 8 schematically shows the main portion of another superconducting bearing device, i.e., an eighth embodiment.

In this embodiment, the superconductor 2 of the sixth embodiment is replaced by a superconductor 6 opposed to the outer peripheral surface of the permanent magnet portion 11.

As already described with reference to the sixth embodiment, the magnetic flux expands both axially and radially of the rotatable member also in this case, with the result that in increased quantity of flux penetrates into the superconductor 6 which is disposed as opposed to the outer peripheral surface of the magnet portion 11.

A method for setting up a superconducting bearing device is now described with reference to FIG. 9. The method of setting up a superconducting bearing device can be applied to any of the above-described embodiments of the device.

Figure 9:
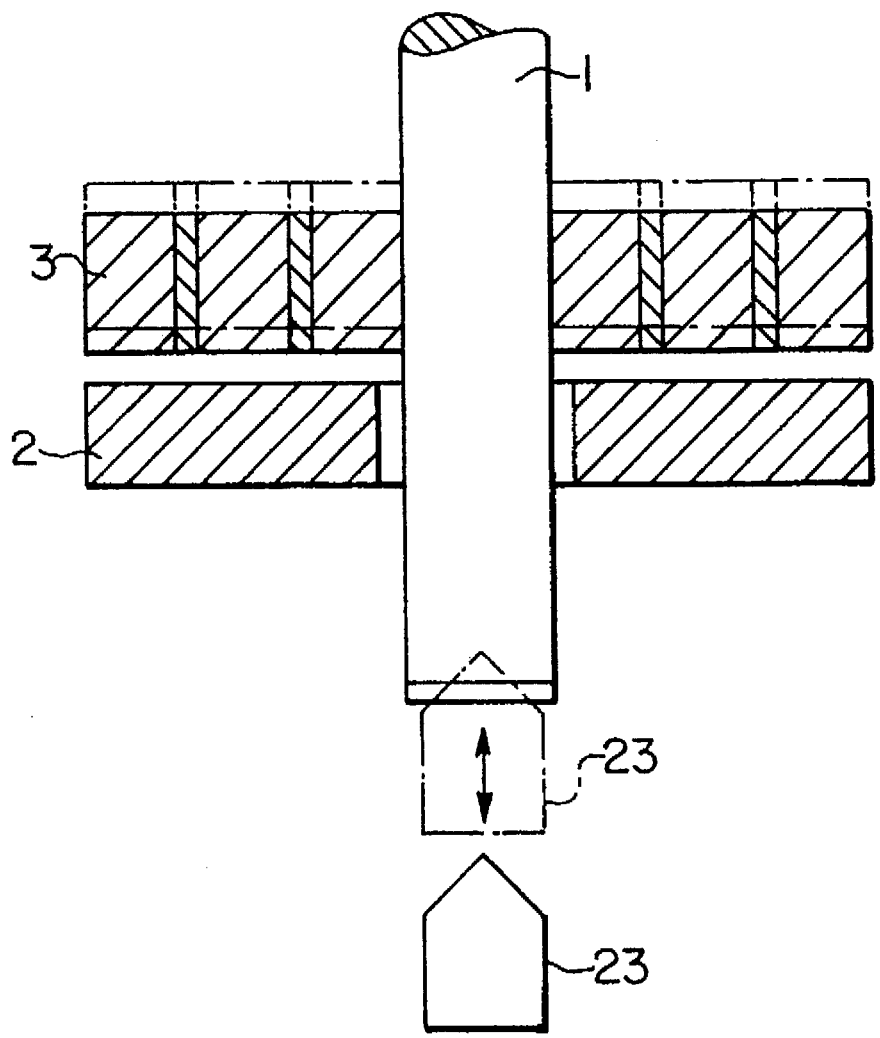
FIG. 9 illustrates a method for setting up a superconducting bearing device in accordance with a preferred embodiment of the present invention.

As shown in dotted lines in FIG. 9, a permanent magnet 3 is attached to a stationary rotor 1. Rotor 1 is disposed close to a superconductor 2 which is not yet in a superconducting state. A suitable positioning means 23 supports the rotor mechanically.

With the rotor and superconductor in this position, flux from permanent magnet 3 penetrates into the interior of the superconductor before it is cooled to a superconducting state. After being thus positioned, the superconductor 2 is cooled to realize a Type II superconducting state. Magnetic flux which penetrates the interior of the superconductor 2 is pinned.

The magnetic flux distribution of the permanent magnet 3 is symmetrical about the rotor's axis. Accordingly, rotation of the rotor does not alter the magnetic flux distribution around the axis of rotation. By implication, the magnetic flux pinned to the interior of the superconductor 2 is also symmetrical about the axis of the rotor 1.

As illustrated in solid lines in FIG. 9, after the magnetic flux is pinned in the interior of the superconductor the positioning means 23 descends, thus removing physical (mechanical) support from the rotor. However, based on principles applied by the present invention, the rotor is supported by the magnetic flux pinned to the interior of the superconductor. When the mechanical support is removed from the rotor (shown in solid lines), gravity causes the rotor to initially descend slightly, against the pinning force of the magnetic flux which supports it. The rotor stops at a vertical height at which the downward force of gravity balances the supportive pinning force.

Because the axis of rotation of the rotor is vertical, the downward displacement of the rotor constitutes a motion in an axial direction. Accordingly, even when the rotor descends, the rotor's axis is not displaced radially. Therefore, when the mechanical support is removed from the rotor, the distribution of magnetic flux pinned to the superconductor's interior remains symmetrical about the rotor's axis. By implication, the invention's choice of a vertical axis of rotation allows the pinned magnetic flux to remain symmetrical about the axis of rotation even when the mechanical support is withdrawn.

Accordingly, when the vertically-oriented rotor rotates, the magnetic flux distribution around its axis, including the flux pinned in the interior of the superconductor, remains symmetrical, so that the rotor is supported by the force resulting from the pinned flux and the rotation is stable and does not deteriorate as it would with arrangements other than that of the invention.

In view of the foregoing, the invention provides a method for setting up a superconducting bearing device having the steps of, first, mechanically supporting the rotor at a position with respect to the Type II superconductor to permit magnetic flux from the permanent magnet to penetrate the Type II superconductor to magnetize it. Thereafter, the Type II superconductor is moved to and held at a temperature for realizing a Type II superconducting state. Finally, mechanical support is removed from the rotor to allow it to move downward by its own weight to be held in a stable position at which gravity is in balance with a supportive magnetic force caused by the pinned flux.

This method may also be expressed in the following manner, in which the principles of operation are expanded on. The method involves setting up a superconducting bearing device which has a permanent magnet mounted on a rotor having a vertical axis of rotation and a Type II superconductor disposed in a magnetic field of the permanent magnet. The permanent magnet is provided on the rotor so that rotation of the rotor does not alter a magnetic flux's distribution about the axis of rotation of the rotor. The method has the first step of supporting the rotor by a positioning device, and spacing and positioning the rotor a distance from the Type II superconductor to permit a predetermined quantity of magnetic flux from the permanent magnet to penetrate the Type II superconductor, thereby emagnetizing the Type II superconductor by the magnetic field of the permanent magnet. Thereafter, the Type II superconductor is moved to and held at a temperature for realizing a Type II superconducting state, to pin the penetrating magnetic flux in the interior of the Type II superconductor so that the pinned magnetic flux distribution is symmetrical about the vertical axis of rotation of the rotor. Finally, the method includes the step of releasing the rotor from the positioning device and allowing the rotor to move slightly downwardly its own weight to be held in a stable position at which gravity is in balance with a magnetic force caused by the flux pinned to the interior of the superconductor.

Modifications and variations of the above-described embodiments of the present invention are possible, as appreciated by those skilled in the art in light of the above teachings. For example, the foregoing method of setting up a superconducting bearing device can be applied to any of the above-described embodiments of the device.

It is therefore to be understood that, within the scope of the appended claims and their equivalents, the invention may be practiced otherwise than as specifically described.

What is claimed is:

1. A method for setting up a superconducting bearing device which has (1) a permanent magnet mounted on a rotor having a vertical axis of rotation and (2) a Type II superconductor disposed in a magnetic field of the permanent magnet, the permanent magnet being provided on the rotor so that rotation of the rotor does not alter a magnetic flux's distribution about the axis of rotation of the rotor, the method comprising:

(a) supporting the rotor by a positioning means, and spacing and positioning the rotor a distance from the Type II superconductor by the positioning means so as to permit a predetermined quantity of magnetic flux from the permanent magnet to penetrate the Type II superconductor, thereby magnetizing the Type II superconductor by the magnetic field of the permanent magnet;

(b) following said supporting, spacing and positioning step (a), moving the Type II superconductor to, and holding the Type II superconductor at, a temperature for realizing a Type II superconducting state, to pin all the penetrating magnetic flux as it is in the interior of the Type II superconductor so that the pinned magnetic flux distribution is symmetrical about the vertical axis of rotation of the rotor; and (c) following said moving and holding step (b), releasing the rotor from the positioning means and allowing the rotor to move slightly downward by its own weight to be held in a stable position at which gravity is in balance with a magnetic force caused by the flux pinned to the interior of the superconductor.

2. The method of claim 1, wherein:

the permanent magnet is annular in shape and has an axial end face; and said Type II superconductor is positioned opposite the axial end face of the permanent magnet.

3. The method of claim 2, wherein:

the permanent magnet has two axial ends; and the permanent magnet has magnetic poles at both of the two axial ends.

4. The method of claim 2, wherein:

the permanent magnet has radially inner and outer sides; and the permanent magnet has magnetic poles at the radially inner and outer sides.

5. The method of claim 1, wherein:

the permanent magnet has a radially outer periphery; and the Type II superconductor is positioned opposite the radially outer periphery of the permanent magnet.

6. The method of claim 5, wherein:

the permanent magnet has two axial ends; and the permanent magnet has magnetic poles at both of the two axial ends.

7. The method of claim 5, wherein:

the permanent magnet has radially inner and outer sides; and the permanent magnet has magnetic poles at the radially inner and outer sides.

8. The method of claim 1, wherein:

the superconductor is an yttrium type oxide ceramic superconductor.

9. The method of claim 8, wherein:

the yttrium type oxide ceramic superconductor includes normally-conductive particles spread uniformly in the interior thereof, constituting pinning points of the penetrating magnetic flux.

10. The method of claim 9, wherein:

the yttrium type oxide ceramic superconductor is $YBa_2Cu_3O_x$.

11. The method of claim 1, wherein the permanent magnet is in the form of an integral assembly and includes:

a plurality of annular permanent magnets arranged at a spacing radially of the rotor; and a nonmagnetic material interposed therebetween.

12. The method of claim 1, wherein the permanent magnet is in the form of an integral assembly and includes:

a plurality of annular permanent magnets arranged at a spacing axially of the rotor; and a nonmagnetic material interposed therebetween.

13. A method for setting up a superconducting bearing device including (1) a permanent magnet mounted on a rotor having a vertical axis of rotation and (2) a Type II superconductor disposed in the permanent magnet's magnetic field, the permanent magnet being provided on the rotor so that rotation of the rotor does not alter a magnetic flux's distribution about the axis of rotation of the rotor, the method comprising:

(a) first, mechanically supporting the rotor at a position with respect to the Type II superconductor to permit magnetic flux from the permanent magnet to penetrate the Type II superconductor; and thereafter, (b) moving the Type II superconductor to, and holding the Type II superconductor at, a temperature for realizing a Type II superconducting state to pin all the penetrating magnetic flux as it is in the interior of the Type II superconductor; and thereafter, (c) removing mechanical support from the rotor to allow the rotor to move downward by its own weight to be held in a stable position at which gravity is in balance with a supportive magnetic force caused by the pinned flux.

14. The method of claim 13, wherein the permanent magnet is in the form of an integral assembly and includes:

a plurality of annular permanent magnets arranged at a spacing radially of the rotor; and a nonmagnetic material interposed therebetween.

15. The method of claim 13, wherein the permanent magnet is in the form of an integral assembly and includes:

a plurality of annular permanent magnets arranged at a spacing axially of the rotor; and a nonmagnetic material interposed therebetween.

16. A method for setting up a superconducting bearing device which has:

(1) a rotatable shaft having an axis of rotation;

(2) an annular permanent magnet having two axial ends, an axial end face, radially inner and outer sides, and a radially outer periphery, the permanent magnet generating a magnetic flux distribution;

(2a) wherein the annular permanent magnet is provided around the rotatable shaft integrally and concentrically therewith; and (2b) wherein the rotatable shaft does not alter the magnetic flux distribution around the axis of rotation of the rotatable shaft;

(3) a cooling case fixedly positioned radially outward from the rotatable shaft at a predetermined spacing therefrom, the cooling case creating a temperature environment for realizing a Type II superconducting state; and (4) a Type II superconductor which is penetrated by the rotatable shaft with a spacing therebetween and which is fixedly supported to be in contact with the cooling case;

(4a) wherein the superconductor permits penetration of the magnetic flux of the permanent magnet;

(4b) wherein the superconductor is spaced from the permanent magnet by a distance permitting a predetermined quantity of the magnetic flux of the permanent magnet to penetrate thereinto; and (4c) wherein the superconductor is positioned so as to prevent rotation of the rotatable shaft from altering the distribution of penetrating magnetic flux;

the method comprising:

(a) supporting the rotor by a positioning means, and spacing and positioning the rotor a distance from the Type II superconductor by the positioning means so as to permit a predetermined quantity of magnetic flux from the permanent magnet to penetrate the Type II superconductor, thereby magnetizing the Type II superconductor by the magnetic field of the permanent magnet;

(b) following the supporting, spacing and positioning step (a), moving the Type II superconductor to, and holding the Type II superconductor at, a temperature for realizing a Type II superconducting state, to pin all the penetrating magnetic flux as it is in the interior of the Type II superconductor, so that the pinned magnetic flux distribution is symmetrical about the vertical axis of rotation of the rotor; and (c) following the moving and holding step (b), releasing the rotor from the positioning means and allowing the rotor to move slightly downward by its own weight to be held in a stable position at which gravity is in balance with a magnetic force caused by the flux pinned to the interior of the superconductor.

17. The method of claim 16, wherein the permanent magnet is in the form of an integral assembly and includes:

a plurality of annular permanent magnets arranged at a spacing radially of the rotor; and a nonmagnetic material interposed therebetween.

18. The method of claim 16, wherein the permanent magnet is in the form of an integral assembly and includes:

a plurality of annular permanent magnets arranged at a spacing axially of the rotor; and a nonmagnetic material interposed therebetween.

19. A method for setting up a superconducting bearing device which has:

(1) a rotatable shaft having an axis of rotation;

(2) an annular permanent magnet having two axial ends, an axial end face, radially inner and outer sides, and a radially outer periphery, the permanent magnet generating a magnetic flux distribution;

(2a) wherein the annular permanent magnet is provided around the rotatable shaft integrally and concentrically therewith; and (2b) wherein the rotatable shaft does not alter the magnetic flux distribution around the axis of rotation of the rotatable shaft;

(3) a cooling case fixedly positioned radially outward from the rotatable shaft at a predetermined spacing therefrom, the cooling case creating a temperature environment for realizing a Type II superconducting state; and (4) a Type II superconductor which is penetrated by the rotatable shaft with a spacing therebetween and which is fixedly supported to be in contact with the cooling case;

(4a) wherein the superconductor permits penetration of the magnetic flux of the permanent magnet;

(4b) wherein the superconductor is spaced from the permanent magnet by a distance permitting a predetermined quantity of the magnetic flux of the permanent magnet to penetrate thereinto; and (4c) wherein the superconductor is positioned so as to prevent rotation of the rotatable shaft from altering the distribution of penetrating magnetic flux;

the method comprising:

(a) first, mechanically supporting the rotor at a position with respect to the Type II superconductor to permit magnetic flux from the permanent magnet to penetrate the Type II superconductor; and thereafter, (b) moving the Type II superconductor to, and holding the Type II superconductor at, a temperature for realizing a Type II superconducting state to pin all the penetrating magnetic flux as it is in the interior of the Type II superconductor; and thereafter, (c) removing mechanical support from the rotor to allow the rotor to move downward by its own weight bo be held in a stable position at which gravity is in balance with a supportive magnetic force caused by the pinned flux.

20. The method of claim 19, wherein the permanent magnet is in the form of an integral assembly and includes:

a plurality of annular permanent magnets arranged at a spacing radially of the rotor; and a nonmagnetic material interposed therebetween.

21. The method of claim 19, wherein the permanent magnet is in the form of an integral assembly and includes:

a plurality of annular permanent magnets arranged at a spacing axially of the rotor; and a nonmagnetic material interposed therebetween.

* * * * *